(12) United States Patent
Di Stefano et al.

(10) Patent No.: US 11,970,175 B2
(45) Date of Patent: Apr. 30, 2024

(54) SYSTEM FOR OBTAINING A PREDICTION OF AN ACTION OF A VEHICLE AND CORRESPONDING METHOD

(71) Applicant: Marelli Europe S.p.A., Corbetta (IT)

(72) Inventors: Erika Di Stefano, Corbetta (IT); Axel Furlan, Corbetta (IT); Davide Fontana, Corbetta (IT); Ivan Chernukha, Povo (IT); Enver Sangineto, Povo (IT); Niculae Sebe, Povo (IT)

(73) Assignee: Marelli Europe S.p.A., Corbetta (IT)

( * ) Notice: Subject to any disclaimer, the term of this patent is extended or adjusted under 35 U.S.C. 154(b) by 395 days.

(21) Appl. No.: 17/433,191

(22) PCT Filed: Feb. 20, 2020

(86) PCT No.: PCT/IB2020/051422
§ 371 (c)(1),
(2) Date: Aug. 23, 2021

(87) PCT Pub. No.: WO2020/174327
PCT Pub. Date: Sep. 3, 2020

(65) Prior Publication Data
US 2022/0126844 A1  Apr. 28, 2022

(30) Foreign Application Priority Data
Feb. 27, 2019  (IT) .................. 102019000002853

(51) Int. Cl.
*B60W 50/00*  (2006.01)
*B60W 60/00*  (2020.01)
(Continued)

(52) U.S. Cl.
CPC ...... *B60W 50/0097* (2013.01); *B60W 60/001* (2020.02); *G06N 3/044* (2023.01);
(Continued)

(58) Field of Classification Search
CPC ............ B60W 50/0097; B60W 60/001; G06V 10/82; G06V 20/56; G06N 3/045; G06N 3/044
See application file for complete search history.

(56) References Cited

U.S. PATENT DOCUMENTS 9,760,806 B1  9/2017 Ning et al.
2006/0111820 A1*  5/2006 Goetting ............... B62D 13/06
701/1

(Continued)

FOREIGN PATENT DOCUMENTS

JP   2018199473 A   12/2018
JP   2019028616 A   2/2019

OTHER PUBLICATIONS

International Search Report and Written Opinion of the International Searching Authority for PCT International Application No. PCT/IB2020/051422 dated May 29, 2020.
(Continued)

*Primary Examiner* — Ramsey Refai
(74) *Attorney, Agent, or Firm* — Howard & Howard Attorneys PLLC

(57) ABSTRACT

A system for obtaining a prediction an action ($a_t$) of a vehicle (V), including a camera for acquiring a sequence of images ($F_t$) a convolutional neural network visual encoder which obtains a corresponding visual features vector ($v_t$), one or more sensor that obtains a position of the vehicle ($s_t$) at the same time step ($s_t$), a Recurrent Neural Network configured to receive the visual features vector ($v_t$) and position of the vehicle ($s_t$) at the time step (t) and to generate a prediction of the action ($a_t$) of the vehicle (V). The system comprising a command conditioned switch configured upon reception of a control command ($c_i$) to select a corresponding branch of the Recurrent Neural Network. The system is configured to operate the selected corresponding branch to process the
(Continued)

visual features vector ($v_t$) and position of the vehicle ($s_t$) at the time step (t) to obtain the prediction of the action ($a_t$) of the vehicle (V).

11 Claims, 4 Drawing Sheets

(51) Int. Cl.
  *G06N 3/044* (2023.01)
  *G06N 3/045* (2023.01)
  *G06V 10/82* (2022.01)
  *G06V 20/56* (2022.01)
(52) U.S. Cl.
  CPC ............ *G06N 3/045* (2023.01); *G06V 10/82* (2022.01); *G06V 20/56* (2022.01); *B60W 2420/403* (2013.01); *B60W 2556/50* (2020.02); *B60W 2710/207* (2013.01); *B60W 2720/10* (2013.01); *B60W 2720/12* (2013.01)

(56) References Cited

U.S. PATENT DOCUMENTS

| | | | | |
|---|---|---|---|---|
| 2011/0060703 | A1* | 3/2011 | Alaniz | G06F 17/17 706/12 |
| 2012/0072039 | A1* | 3/2012 | Anderson | G06Q 10/04 700/297 |
| 2016/0202670 | A1* | 7/2016 | Ansari | G05B 13/026 700/45 |
| 2017/0129538 | A1* | 5/2017 | Stefan | B60W 30/06 |
| 2019/0012574 | A1 | 1/2019 | Anthony et al. | |
| 2019/0049267 | A1 | 2/2019 | Huang | |

OTHER PUBLICATIONS

Chi, Lu, et al., "Deep Steering: Learning End-to-End Driving Model from Spatial and Temporal Visual Cues", arXiv.org, Cornell University Library, Aug. 12, 2017 (12 pages).

Drews, Paul, et al., "Aggressive Deep Driving : Model Predictive Control with a CNN Cost Model", arXiv.org, Cornell University Library, Jul. 17, 2017 (11 pages).

Drews, Paul, et al., "Vision-Based High Speed Driving with a Deep Dynamic Observer", arXiv.org, Cornell University Library, Dec. 5, 2018 (9 pages).

Xu, Huazhe, et al., "End-to-end Learning of Driving Models from Large-Scale Video Datasets", arXiv.org, Cornell University Library, Jul. 23, 2017 (9 pages).

Notice of Reasons for Refusal mailed Dec. 5, 2023 for Japanese Patent Application No. 2021-538257.

First Office Action for Chinese Patent Application No. 2020800118399 dated Jan. 23, 2024.

* cited by examiner

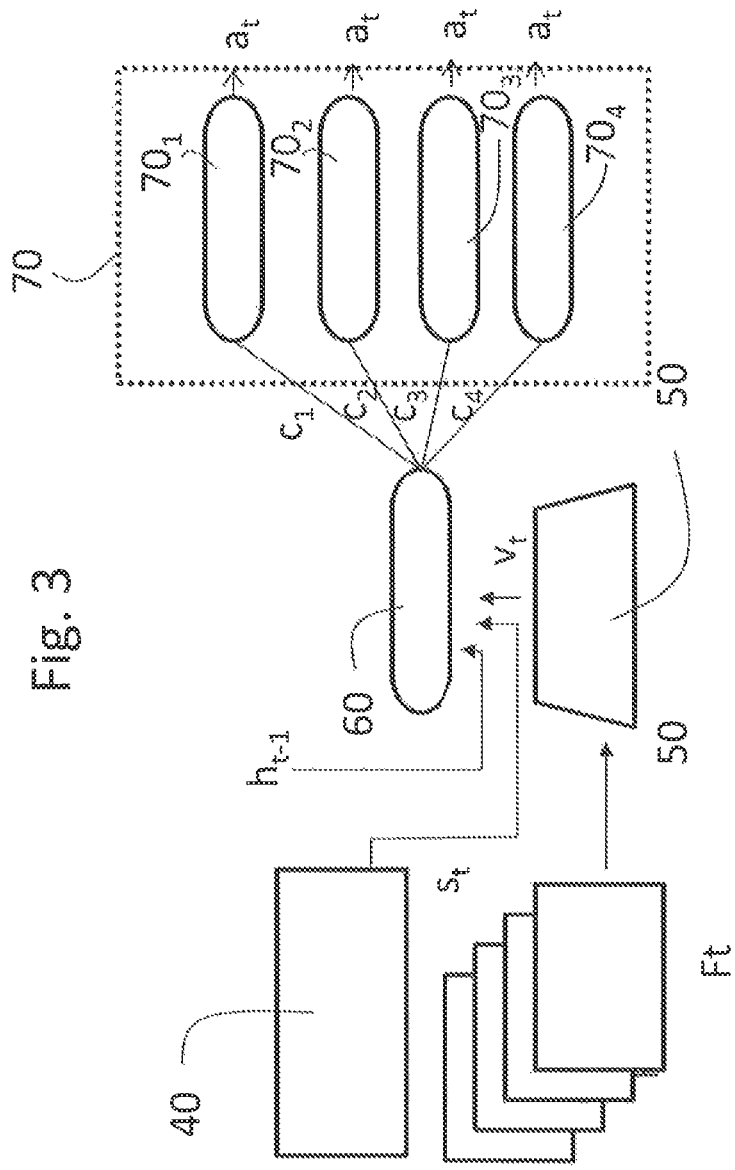

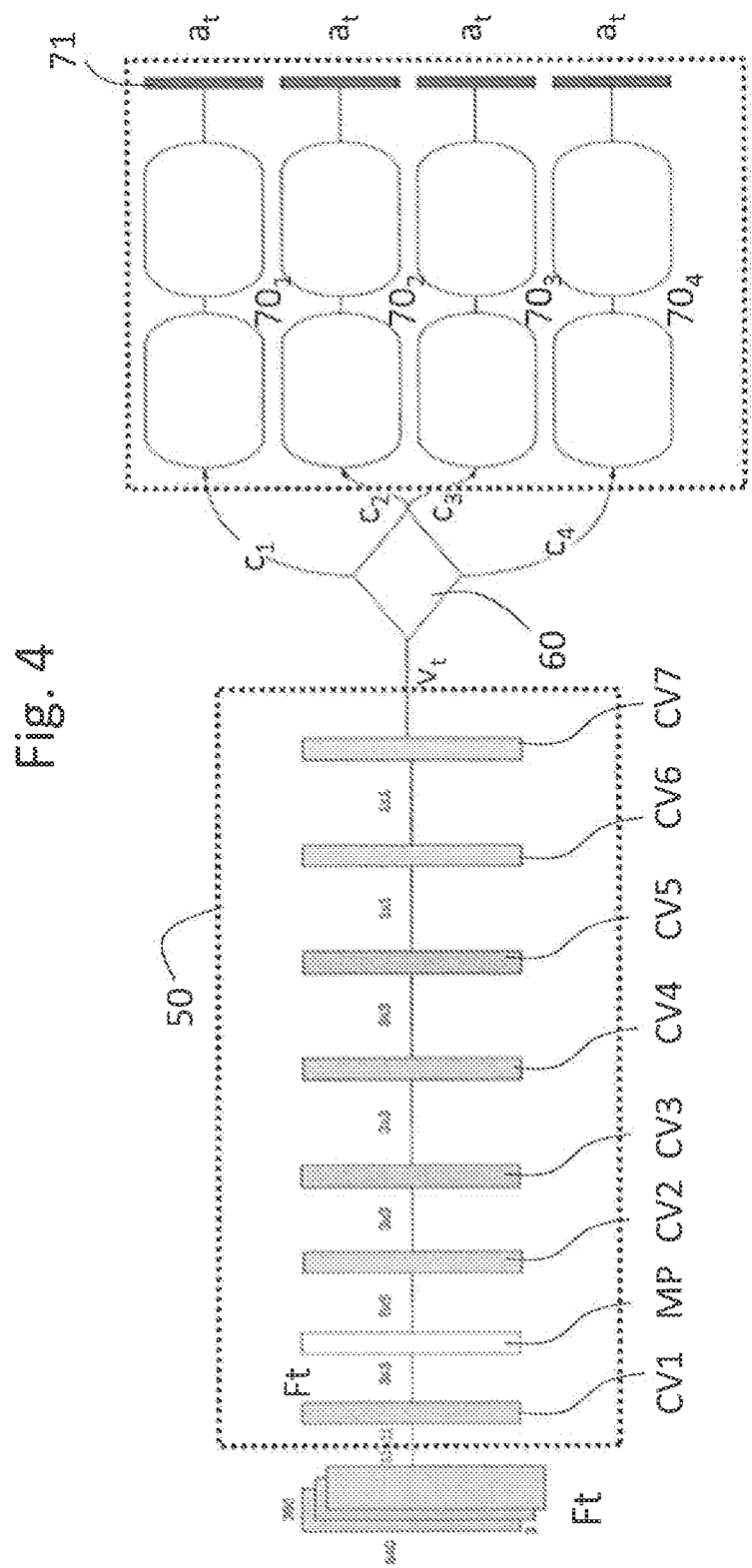

SYSTEM FOR OBTAINING A PREDICTION OF AN ACTION OF A VEHICLE AND CORRESPONDING METHOD

CROSS-REFERENCE TO RELATED APPLICATIONS

The present application is a National Stage of International Patent Application No. PCT/IB2020/051422, filed on Feb. 20, 2020, which claims priority to and all the benefits of Italian Patent Application No. 102019000002853, filed on Feb. 27, 2019, both of which are hereby expressly incorporated herein by reference in their entirety.

BACKGROUND OF THE INVENTION

1. Field of the Invention

The present description relates to techniques for obtaining a prediction of an action of a vehicle, in particular a road vehicle, including a camera for acquiring a sequence of images of the scene dynamic seen by the vehicle, in particular in front of the vehicle, a convolutional neural network visual encoder configured to obtaining for each acquired image in said sequence of images of the scene dynamic seen by the vehicle at each time step a corresponding visual features vector, one or more sensor configured to obtain a position of the vehicle ($s_t$) at the same time step, a Recurrent Neural Network, in particular a LSTM, network configured to receive a visual features vector and position of the vehicle at said time step and to generate a prediction of the action of the vehicle.

2. Description of the Related Art

Most of the deep-learning based autonomous driving methods can be categorized into two major paradigms: mediated perception approaches and behaviour reflex (or end-to-end) methods. The former are composed of different, distinct recognition components such as pedestrian detectors, lane segmentation, traffic light/sign detectors, etc. The corresponding detection outcomes are then combined into an intermediate overall scene representation, which is the knowledge input to a (typically rule-based) decision maker system in order to plan the vehicle's next actions.

On the other hand, the behaviour reflex approach is an emerging paradigm consisting in training a deep network in order to directly map raw data sensors into the vehicle's action decisions. A network which takes raw data sensors (e.g., images) as input and outputs vehicle's actions is also denoted as end-to-end trainable. Modern behaviour reflex approaches use Convolutional Neural Networks (CNNs) to extract visual information from the frames captured by the vehicle's on-board camera, for instance using a simple CNN trained for a regression task: the output neuron predicts the steering angle. One problem with this 'CNN-only' architecture is that every decision depends only on the current frame. There is no "memory" about the observed dynamics of the scene because past frames are not represented at all.

It is known, for instance from the publication of Huazhe Xu, Yang Gao, Fisher Yu, and Trevor Darrell "*End-to-end learning of driving models from large-scale video datasets*" in CVPR, pages 3530-3538, 2017 to introduce a dynamics representation into the network using an LSTM (Long Short Term Memory) network.

Specifically, as shown in FIG. 1 the system 10, which is indeed substantially a neural network, is composed of two main sub-networks, a dilated fully convolutional neural network visual encoder, in short FCN, 50 representing (static) visual information extracted from each frame independently of the other frames. Given a frame $F_t$ input at time step t, the FCN 50 represents the frame $F_t$ using a feature vector $v_t$. Specifically, the feature vector $v_t$ corresponds to the vector of neuron activations of the last layer of the FCN 50. Then, the feature vector $v_t$ is concatenated with a current vehicle position $s_t$ (represented using a 2-dimensional vector) and input to a LSTM network 65. This second sub-network predicts the most likely action $a_t$ taking into account its previous hidden state value.

A continuous prediction can be formulated using a regression task and a mean squared error loss. However, it has been widely observed by different works that this loss performs poorly, for instance when the target distribution is multimodal. Therefore, the regression problem is cast in such solution into a classification task using discrete bins which represent the target value's range. In more detail, the possible range of values of steering angle $\alpha_t([-90, 90]$ degrees) is discretized into N=181 bins. Similarly, the possible range of values of vehicle speed $m_t$ is discretized in N=181 bins. Consequently, the number of output neurons of the network is 2N=362, each neuron corresponding to a "bin-class" and the adopted loss function (see following Eq. 1 and 2) is a standard cross entropy between the predicted and the true class values. In Eq. 1, expressing steering angle loss $H(p_\alpha, q_\alpha)$, $q_\alpha(x)$ is the network prediction and $p_\alpha(x)$ is the training ground truth and, similarly, Eq. 2 refers to the speed loss $H(p_m, q_m)$.

$$H(p_\alpha, q_\alpha) = -\Sigma p_\alpha(F_t, s_t) \log q_\alpha(F_t, s_t) \tag{1}$$

$$H(p_m, q_m) = \Sigma p_m(F_t, s_t) \log q_m(F_t, s_t) \tag{2}$$

The final loss is an equally-weighted sum of two cross entropy losses.

Such a solution, besides having poor losses, is based only on the sensor, thus lacks a high-level control of the network behaviour.

SUMMARY OF THE INVENTION

An object of one or more embodiments is to overcome the limitations inherent in the solutions achievable from the prior art.

According to one or more embodiments, that object is achieved thanks to a method having the characteristics specified in claim 1. One or more embodiments may refer to a corresponding system.

The claims form an integral part of the technical teaching provided herein in relation to the various embodiments.

According to the solution described herein, the system is configured to receive as input a set of control commands representing maneuvers of the vehicle, the Recurrent Neural Network comprising a plurality of Recurrent Neural Network branches each corresponding to a control command in the set of control commands, the system including a command conditioned switch configured upon reception of a control command to select the corresponding branch of the Recurrent Neural Network, the system being then configured to operate the selected corresponding branch to process the visual features vector and position of the vehicle at the time step to obtain the prediction of the action of the vehicle.

The solution described herein is also directed to a corresponding method for predicting an action of a vehicle. Other objects, features and advantages of the present invention will be readily appreciated as the same becomes better understood after reading the subsequent description taken in connection with the accompanying drawings.

BRIEF DESCRIPTION OF THE DRAWINGS

The embodiments will now be described purely by way of a non-limiting example with reference to the annexed drawings, in which:

FIG. 3 represents a block schematic of the system here described; and

FIG. 4 represent in more detail the system of FIG. 4.

DETAILED DESCRIPTION OF THE INVENTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

In brief here is described a system and method for obtaining a prediction for an action of a vehicle which is based on a deep-learning based method for autonomous driving based on a network trained "end-to-end". The solution here described jointly models the scene dynamics observed by the vehicle while moving and a command-conditioned decision strategy which takes into account high-level commands representing, for instance, the passenger's goal (i.e. the desired destination). Scene dynamics are modeled using a Recurrent Neural Network (specifically, using an LSTM). The solution here described however regards a system and method that while modelling scene dynamics also takes into account the passenger's goal, instead of having a resulting network which is a function of only the sensor data. The solution here described, providing a high-level control of the network behaviour, makes use of "commands", externally provided as an additional input to the network, in order to condition the network behaviour.

Figure 1:
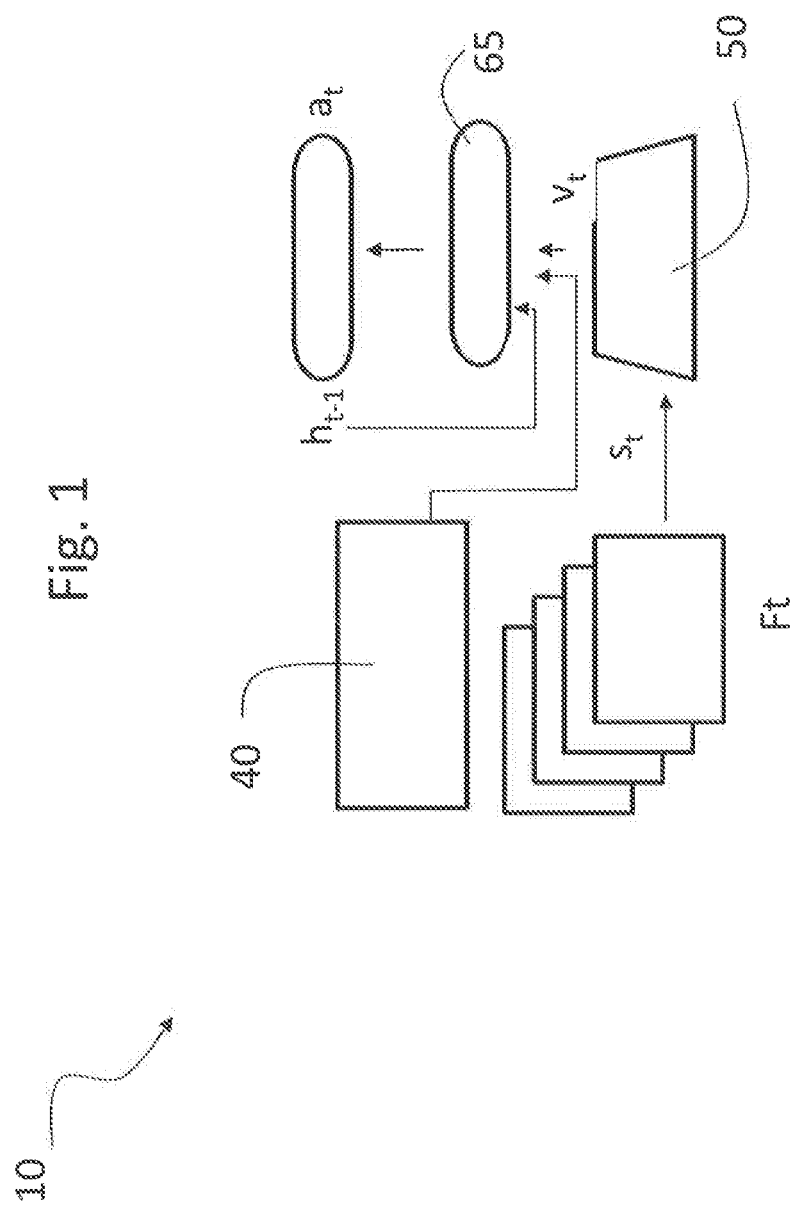
FIG. 1 has been already discussed in the foregoing.
Figure 2:
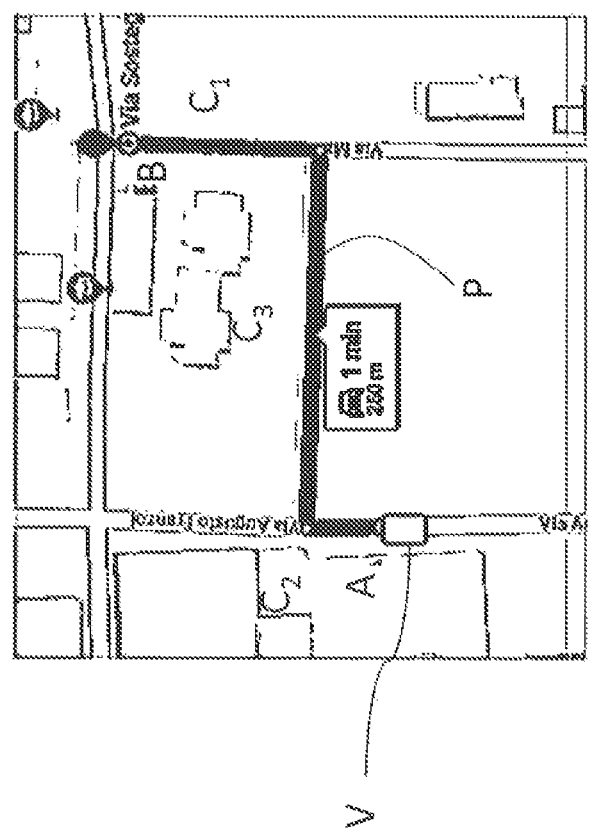
FIG. 2 illustrates a context of application of the solution here described.

By way of example, with reference to FIG. 2 showing schematically a road map with streets, suppose a passenger, e.g. a vehicle V, in particular a road or land vehicle, desires to go from a point A to a point B. The navigator would produce the following sequence of commands corresponding to a path P: turn right ($c_4$ as better detailed in the following) at the next intersection, turn left ($c_2$) at the next intersection, follow the road ($c_1$). The network function is now described by a function of sensors and commands and can be externally controlled. The commands, e.g. left, ask to the network to plan a short-term policy, i.e. a vehicle maneuver corresponding to a sequence of actions) which is able to drive the vehicle till the next intersection and then turn left.

A system 20 for obtaining a prediction of an action at of a vehicle V, according to the solution here described is shown in FIG. 3.

With 50 is indicated a dilated fully convolutional neural network visual encoder which receives image frames $F_t$ representing the observed dynamics of the scene acquired by a front camera mounted on the vehicle V, not shown, at a time step t, and extract corresponding visual representations $v_t$, e.g. foreground pixel and background pixel, on the basis of such image frames $F_t$. As mentioned dilated FCN 50 is for instance a CNN extracted from the well known AlexNet having replaced the last dense layers with 1×1 convolutional filters as discussed for instance in Xu et al. It is pre-trained on ImageNet and then fine-tuned together with the rest of the network. Dilated FCN 50 is configured to represent visual information $v_t$ extracted from each frame $F_t$ independently of the other frames, i.e. static visual information. More specifically, given a frame $F_t$ input at time step t, the dilated FCN 50 represents such frame $F_t$ using a feature vector, or visual vector, $v_t$ obtained by the neuron activations of its last layer The dilated FCN 50 outputs CNN features vector $v_t$ to a command conditioned switch block 60 which receives also a current position of the vehicle $s_t$. The current vehicle position $s_t=(x_t, y_t)$ where $x_t, y_t$ are the coordinates of the vehicle V at time step t and are obtained using egomotion sensors, represented by an ego-motion sensor block 40. Ego-motion sensors are sensors that measure the vehicle motion with respect to an arbitrarily fixed reference frame (e.g., IMU sensors). The trajectory output by these sensors is synchronized with the camera frames in such a way to get a position at each time step t.

Then the CNN features $v_t$ in the command block 60 is concatenated with the vehicle's current position $s_t$, represented using a two dimensional vector $(x_t, y_t)$ into a joint representation $(s_t, v_t)$. A LSTM network 70 includes a plurality of LSTM branches $70_1, 70_2, 70_3, 70_4$, in the example four. The command block 60 upon receiving a control command $c_t$ is configured to switch to an LSTM branch among the plurality of LSTM branches $70_1, 70_2, 70_3, 70_4$, corresponding to such control command $c_t$.

Specifically, the control command $c_t$ acts as a switch between branches $70_1, 70_2, 70_3, 70_4$. During the "forward-pass", only one of the branches is activated, depending on the input command $c_t$. As a consequence, only the sub-policy corresponding to the current value of branches $70_1, 70_2, 70_3, 70_4$ is involved when the joint representation $(s_t, v_t)$ is processed. Preferably, the joint representation $(s_t, v_t)$ is input to each LSTM branch, but only the selected branch processes such input.

The control command $c_t$ is originated from a predefined set C of commands $c_i$ with i index from 1 to ICI which for instance can be $C=\{c_1, c_2, c_3, c_4\}$, where $c_1, c_2, c_3, c_4$ are respectively in the example here shown continue, left, straight, right. These control commands $c_t$ can be originated, for instance, by a navigator of the vehicle V.

The system 20 outputs, i.e. learns, a map function f (Ft, $s_t$, $c_t$)→$a_t$, where $a_t$ is a predicted vehicle's action at time step t, i.e. a map of predicted vehicle's actions as a function of an acquired image $F_t$, in particular represented by the corresponding CNN features $v_t$, and of the vehicle's current position $s_t$ and command $c_t$.

Since continuous outputs are used, the predicted vehicle's action $a_t$ is defined as a pair of steering angle and speed magnitude: $\alpha_t$ ($a_t$, $m_t$), where $\alpha_t$ is the steering angle in radiants, and $m_t$ is the vehicle speed value.

It is underlined that control commands are used as input to the system 20 or network in order to choose a short-term policy, while actions are the instantaneous outputs of the system 10, i.e. compose such short-term policy.

Each LSTM branch $70_i$ predicts the most likely action $a_t$ taking into account its previous hidden state value $h_{t-1}$, which represents the visual dynamics. It is important to note that, although FIG. 3 shows one single hidden state $h_{t-1}$, actually each LSTM in each branch computes its own hidden state $h_{t-1}$.

In FIG. 4 part of the system 20 is shown in a more detailed manner.

Each input frame $F_t$ is resized into a resolution of 360×640 pixels and represented with 3 RGB channels. The FCN 50 includes a first convolutional layer CV1 96 11×11 filters, then a MaxPool layer MP with 3×3 filters, a second convolutional layer CV2 27×27×256 with 5×5 filters at stride 1, a third convolutional layer with 384 3×3 filters at stride 1, pad 1, a fourth convolutional layer CV4 with 384 3×3 filters at stride 1, pad 1 [13×13×256] a fifth convolutional layer CV5 with 256 3×3 filters at stride 1, pad 1, then a sixth convolutional layer CV6 and seventh convolutional layer CV7 with 4096 1×1 filters. Each LSTM branch $70_i$ comprises two stacked LSTM layer including each 64 neurons. A final output layer 71, in each branch, is composed of 362 neurons, in particular is a FC Softmax layer 64×362. After the sixth convolutional layers CV6 and the seventh convolutional layer CV7 a Dropout layer with a dropout factor equal to 0.5 may be applied for regularization.

Thus, summing up, the system 20 for obtaining a prediction an action $a_t$ of a vehicle V, i.e. a road or land vehicle, just described, includes a camera for acquiring a sequence of images $F_t$ of the scene dynamic seen by the vehicle V, which is in particular in front of the vehicle V, i.e. takes the images of what it is in front of the vehicle V, a convolutional neural network visual encoder 50, preferably a dilated FCN, configured to obtain for each acquired image $F_t$ at a different time t in said sequence of images $F_t$ of the scene dynamic seen by the vehicle V at each time step t a corresponding visual features vector $v_t$, for instance representing a classification of the pixel of the image in according to classes such as foreground, background and others, one or more sensor 40, e.g. egomotion sensors obtained by exploting the camera acquired image frames, configured to obtain a position of the vehicle $s_t$ at the same time step, a Recurrent Neural Network, in particular a LSTM, network 70 configured to receive the visual features vector $v_t$ and position of the vehicle $s_t$ at time step t and to generate a prediction of the action $a_t$ of the vehicle (V) taking in account the previous hidden state $h_{t-1}$, wherein such system 20 is configured to receive as input a set of control commands C representing maneuvers of the vehicle V, in particular corresponding to a sequence of actions, the Recurrent Neural Network 70 comprising a plurality of Recurrent Neural Network branches $70_1$, $70_2$, $70_3$, $70_4$ each corresponding to a control command $c_i$ in the set of control commands C. The system 20 includes a command conditioned switch 60 configured upon reception of a control command $c_i$ to select the corresponding branch $70_1$, $70_2$, $70_3$, $70_4$ of the Recurrent Neural Network 70. The system 20 is configured to operate the selected corresponding branch $70_1$, $70_2$, $70_3$, $70_4$, selected by the switch 60, to obtain the prediction of the action $a_t$ of the vehicle V by processing the input, i.e. the visual features vector $v_t$ and position of the vehicle $s_t$ at the time step t, in particular as a map of the image acquired Ft, position of the vehicle $s_t$ and control command $c_t$ at a same given time step t. As indicated, the system 20 preferably supplies the visual features vector $v_t$ and position of the vehicle $s_t$ at the time step t to each corresponding branch $70_1$, $70_2$, $70_3$, $70_4$, then only the selected branch processed the input, this representing a simpler implementation than applying the visual features vector $v_t$ and position of the vehicle $s_t$ input only to the selected branch.

The system 20 described is preferably included in an autonomous driving system, for instance to provide predictions of actions to be performed by the vehicle to follow a certain path P.

To better understand the performance of the system 20 of FIGS. 3 and 4 here is now briefly discussed the loss function associated to such system 20.

In equation 3 below is it shown a loss function Loss ($F_t$, $s_t$, $c_t$) of the system 20.

$$\text{Loss}(F_t, s_t, c_t) = \sum_{i=1}^{|C|} 1(c_i, c_t) H(p_\alpha, q_\alpha) + \sum_{i=1}^{|C|} 1(c_i, c_t) H(p_m, q_m) \quad (3)$$

The first term is a sum of cross entropy losses of the steering angle $\alpha$ and the second term is a sum of cross entropy losses for the speed m, over the command nimne |C|. As indicated, are function of the predictions $q_\alpha$, $q_\alpha$, and $p_\alpha$, $p_m$ is the training ground truth. The number of branches corresponds to the number of commands (|C|), thus to the number of loss components in each term. Each branch $70_i$ is responsible for learning from examples corresponding to a command $c_i$. Therefore, one backpropagation pass for a sample associated with a ground-truth command $c_t$ should contribute to back-propagate the error only in the branch $70_i$, where $c_t = c_i$. In Eq. 3 this is represented by an indicator function $1(c_i, c_t)$, which is equal to 1 if and only if $c_t = c_i$. For efficiency reasons, the control commands $c_i$ are encoded as a one-hot vector.

Thus, the advantages of the method and system just disclosed are clear.

The method and system described allows predicting the action improving the LSTM operation by using a command conditioned network.

The known solutions which use FCN and LMTS are reflexive system, where the LMTS supplies the steering angle or other parameters as a reaction to the output of the FCN encoder. The method and system described by using the command conditioned network, where each LMTS is trained for a specific vehicle maneuver, is able to operate by taking into account the passenger's final destination (which is represented as input to the network as a sequence of commands, the latter provided by the vehicle's Navigator).

In addition, the solution described applies a dynamic input coming from a sequence of image to the command conditioned network of LSTM branches instead of a static input.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

Of course the neural networks of the system, i.e. here described can be implemented by one or more processors or microprocessors or any processing system, in particular any processing system arranged in the vehicle which is able to support such neural networks.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A system for obtaining a prediction an action ($a_t$) of a vehicle (V), including:
    a camera for acquiring a sequence of images ($F_t$) of the scene dynamic seen by the vehicle (V), in particular in front of the vehicle (V),
    a convolutional neural network visual encoder configured to obtaining for each acquired image ($F_t$) in said sequence of images ($F_t$) of the scene dynamic seen by the vehicle (V) at each time step (t) a corresponding visual features vector ($v_t$),
    one or more sensor configured to obtain a position of the vehicle ($s_t$) at the same time step ($s_t$),
    a Recurrent Neural Network, in particular a LSTM, network configured to receive said visual features vector ($v_t$) and position of the vehicle ($s_t$) at said time step (t) and to generate a prediction of the action ($a_t$) of the vehicle (V) taking in account the previous hidden state ($h_{t-1}$),
    wherein the system is configured to receive as input a set of control commands (C) representing maneuvers of the vehicle (V),
    said Recurrent Neural Network comprising a plurality of Recurrent Neural Network branches each corresponding to a control command ($c_i$) in said set of control commands (C),
    said system comprising a command conditioned switch configured upon reception of a control command ($c_i$) to select the corresponding branch of said Recurrent Neural Network,
    said system being then configured to operate said selected corresponding branch to process said visual features vector ($v_t$) and position of the vehicle ($s_t$) at said time step (t) to obtain said prediction of the action ($a_t$) of the vehicle (V).

2. The system as set forth in claim 1, wherein said Recurrent Neural Network includes a LSTM network.

3. The system as set forth in claim 1, wherein said convolutional neural network visual encoder is a dilated fully convolutional neural network visual encoder.

4. The system as set forth in claim 1, wherein said system being configured to operate said corresponding branch to obtain said prediction of the action ($a_t$) of the vehicle (V) as a map of said image acquired ($F_t$), position of the vehicle ($s_t$) and control command (ct) at a same given time step (t).

5. The system as set forth in claim 1, wherein said maneuvers are included in a navigation path of the vehicle, in particular provided by a navigation system.

6. The system as set forth in claim 1, wherein said action includes a steering angle and a vehicle speed.

7. The system as set forth in claim 1, wherein said system is included in a system for the autonomous driving of the vehicle.

8. A method for predicting an action ($a_t$) of a vehicle, including
    acquiring a sequence of images ($F_t$) of the scene dynamic seen by the vehicle (V), in particular in front of the vehicle (V),
    obtaining at each time step (t) a visual features vector (vt) by applying a convolutional neural network, in particular dilated fully convolutional neural network, visual encoder to a corresponding acquired image (Ft),
    obtaining a position of the vehicle ($s_t$) at the same time step ($s_t$),
    supplying said visual features vector ($v_t$) and position of the vehicle ($s_t$) at said time step (t) to a Recurrent Neural Network, in particular a LSTM network,
    determining a set of control commands (C) representing maneuvers of the vehicle (V)
    providing a plurality of branches of said Recurrent Neural Network each corresponding to a control command ($c_i$) in said set of control commands (C),
    when a control command ($c_i$) is issued, selecting the corresponding branch of said Recurrent Neural Network and supplying said visual features vector ($v_t$) and position of the vehicle ($s_t$) at said time step (t) to said corresponding branch,
    operating said corresponding branch to said prediction of the action ($a_t$) of a vehicle.

9. The method as set forth in claim 8, wherein said operating said corresponding branch to obtain said prediction of the action ($a_t$) of the vehicle (V) as a map of said image acquired (Ft), position of the vehicle ($s_t$) and control command (ct) at a same given time step (t).

10. The method as set forth in claim 8, wherein said maneuvers are included in a navigation path of the vehicle.

11. The method as set forth in claim 8, wherein said action includes a steering angle and a vehicle speed.

* * * * *